Aug. 6, 1929.  F. J. WELCH ET AL  1,723,978
VALVE
Filed Feb. 16, 1927
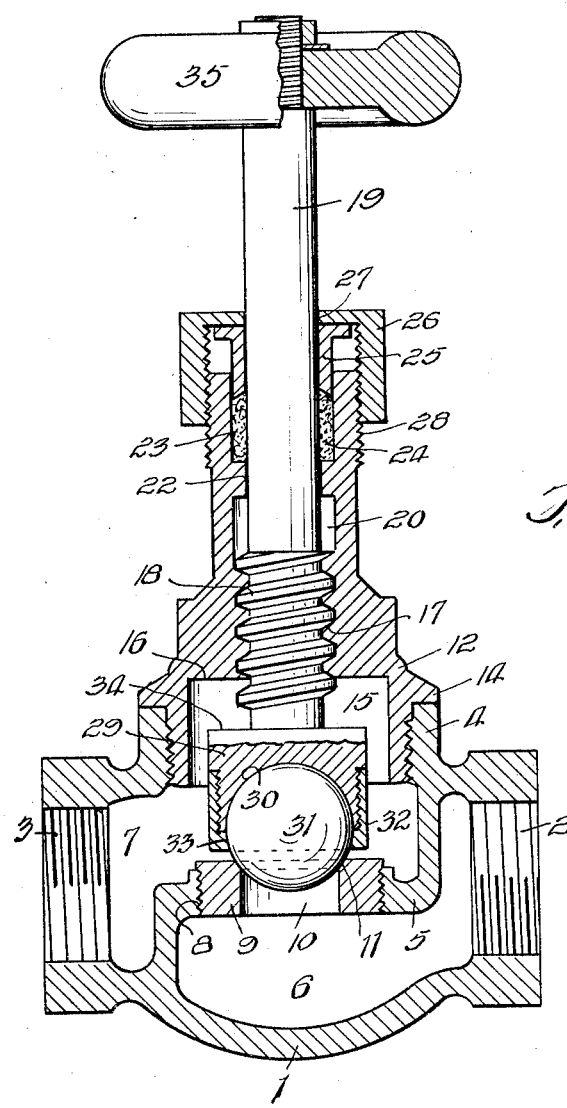
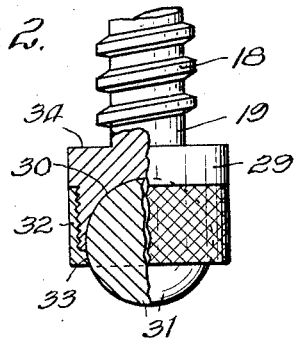
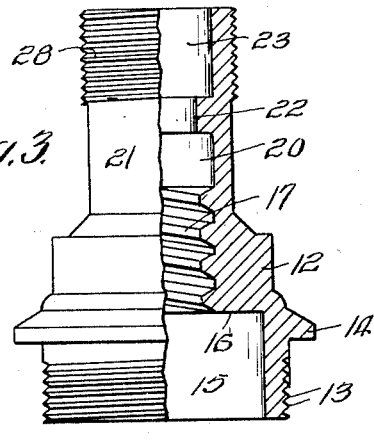
Inventors:
F. J. Welch.
O. G. Hawkins.
J. G. Hagenlocker.
BY
ATTORNEY.

Patented Aug. 6, 1929.

1,723,978

UNITED STATES PATENT OFFICE.

FRANK J. WELCH, OF ST. LOUIS, MISSOURI, AND OTTAS G. HAWKINS AND JOHN G. HAGENLOCKER, OF EAST ST. LOUIS, ILLINOIS, ASSIGNORS TO LEON A. HAWKINS, OF SPRINGFIELD, MISSOURI.

VALVE.

Application filed February 16, 1927. Serial No. 168,554.

Our invention relates to valves, and, the invention is a distinct and practical improvement to overcome certain practical objections to, and defects in, the present style of valves.

The essential object of the invention is the provision of means whereby the valve is held leak proof in its closed position and leak proof around the valve stem in its open position.

A further object of the invention is the provision of a valve wherein a steel ball mounted in a socket is movable into and out of engagement with a replaceable seat.

A further object of the invention is the provision of a valve which possesses advantages in points of simplicity and efficiency, and, at the same time proves itself comparatively inexpensive in cost of manufacture.

With the above and other objects in view, the invention consists in the novel features of construction, arrangement and combination of parts hereinafter more fully described and finally pointed out in the claims hereto appended.

Referring to the accompanying drawings forming a part of this specification, wherein like characters of reference denote similar parts throughout the several views:

Fig. 1, is a vertical sectional view of a valve embodying the features of our invention.

Fig. 2, is a view partly in side elevation and partly in sectional elevation of the lower or socket end of the valve stem.

Fig. 3, is a view partly in side elevation and partly in sectional elevation of the closing cap.

Fig. 4, is a sectional elevation of the replaceable valve seat.

Referring to the drawings, the reference numeral 1 represents a valve casing, shown as of globe form, although not necessarily limited thereto and having on one side an internally screw threaded coupling neck 2 and having on its opposite side an internally screw threaded coupling neck 3, said necks furnishing the attachment for inlet and outlet pipes, not shown, as is manifest.

The center body portion of the casing has an internally screw threaded coupling neck 4. The center portion of the casing 1 is also provided with an interior division wall 5 for separating the interior of the casing 1 into an inlet passage 6 from the inlet coupling neck 2 and an outlet passage 7 from the outlet coupling neck 3, so that when the valve is open, steam, or other fluid or liquid can flow through the valve. The division wall 5 has a central internally screw threaded opening 8 to receive an exteriorly screw threaded valve seat member 9 having a central opening 10 provided at its upper end with a countersunk seat 11.

A closing cap 12 is provided at its lower end with an externally screw threaded portion 13 for screw threaded connection with the internally screw threaded coupling neck 4 and is provided with a flange 14 for contact with the upper face of the coupling neck 4 to form an effective seal. The lower portion of the closing cap 12 is provided with an enlarged recess or chamber 15 having a flat upper end face 16. The closing cap is also provided in its center with an internally screw threaded bore, or opening 17 communicating at its lower end with the recess 15 and adapted to receive the externally screw threaded section 18 of a valve stem 19. The upper end of the internally screw threaded opening 17 communicates with a non-screw threaded opening, or bore 20 in the neck portion 21 of the closing cap and which bore is divided by means of a valve stem bearing 22 so as to form a chamber 23 above the bearing 22 to receive a suitable packing 24 around the valve stem 19. A flanged packing sleeve 25 through which the valve stem 19 passes, is partly receivable in upper end of the bore 20 with its lower countersunk end in contact with the packing 24. An internally screw threaded cap 26 having a central opening 27 for the passage of the valve stem 19 has connection with the external screw threads 28 of the neck portion 21 of the closing cap for tightening the flanged packing sleeve 25 against the packing 24, as is manifest.

The lower end of the valve stem 19 is provided with a head 29 having a substantially semi-spherical socket 30 in its lower face for the reception of a steel valve ball 31. A cap 32 having a central countersunk opening 33 of slightly less diameter than the steel ball 31 has screw threaded connection with the socket head 29 and provides means for holding the valve ball 31 in a rotatable state in the socket 30 and yet partly extend through the countersunk opening 33 in the cap 32 for seating engagement with the countersunk seat 11 in the seating member, or disc 9 when the valve is in its closed position, as clearly shown in Fig. 1, thus forming a positive leak proof connection between the ball 31 and the seat 11.

The upper face 34 of the socket head 29 is flat for engagement with the upper flat face 16 of the closing cap recess 15 when the valve is open to provide a leak proof joint between the socket head and closing cap when the valve is open, thus preventing leakage of steam or liquid under pressure from around the screw threads of the valve stem to find its way to the packing chamber when the valve is open.

The upper end of the valve stem is provided with the usual style of handle 35 for turning the valve stem 19.

From the foregoing description, it is evident that we provide a valve through the use of the steel valve ball 31 which will be held tightly in its closed position with a metal to metal joint.

The many advantages of the herein described invention will readily suggest themselves to those skilled in the art to which it appertains.

We do not wish to be understood as having limited ourselves to the exact details of construction and arrangement of parts as herein described and illustrated, as it is manifest that various minor changes and modifications may be made without departing from the spirit and scope of our invention and the terms of the following claims, hence we wish it to be understood that we reserve the right to make any such changes, or modifications, as may fairly fall within the scope of the appended claims when fairly construed.

What we claim is:

1. In combination with a valve stem, a head for said valve stem, a semi spherical socket in the lower face thereof, a steel ball having half of its surface in bearing contact with said socket, a cap secured to said head having a central countersunk opening through which a portion of the ball extends and said countersunk opening being continuous with the socket to provide an unbroken bearing surface for more than half of the surface of the steel ball.

2. A valve comprising, in combination, a casing having an inlet opening and an outlet opening, a division wall between said openings having a screw threaded opening, a seating member having screw threaded engagement with said opening and provided with a central opening having a countersunk upper edge, a closing cap having screw threaded connection with said casing, a valve stem having screw threaded connection with said closing cap, a bearing formed in said closing cap for said valve stem, a chamber formed in said closing cap above said bearing, a packing in said chamber, a flanged packing sleeve having a countersunk lower end surrounding the valve stem and for contact with said packing, a cap member having screw threaded connection with the closing cap for tightening the flanged sleeve against said packing, a head member integral with the lower end of the valve stem, a semi-spherical socket formed in the lower face of said head member, external screw threads for said head member, a steel ball having fifty percent of its entire surface in seating contact with said socket, a cap having a central countersunk opening of less diameter than the steel ball and through which opening the unseated portion of the steel ball extends and said cap having screw threaded engagement with the head member and providing an unbroken surface between the socket and the countersunk seat of the cap for retaining more than half of the surface of the ball in frictional contact with the socket of the head member and cap at all times.

In testimony whereof we have hereunto affixed our signatures.

FRANK J. WELCH
OTTAS G. HAWKINS.
JOHN G. HAGENLOCKER.